(12) United States Patent
Hasegawa et al.

(10) Patent No.: US 9,562,279 B2
(45) Date of Patent: Feb. 7, 2017

(54) PRESPRAY PROCESSING METHOD

(75) Inventors: Kiyoshi Hasegawa, Yokohama (JP); Shuuji Adachi, Tokyo (JP); Mitsuo Uchiyama, Yokosuka (JP); Yoshirou Noguchi, Yokosuka (JP); Takahiro Iwasaki, Isehara (JP); Kimio Nishimura, Yokohama (JP)

(73) Assignee: NISSAN MOTOR CO., LTD., Yokohama-Shi (JP)

( * ) Notice: Subject to any disclaimer, the term of this patent is extended or adjusted under 35 U.S.C. 154(b) by 565 days.

(21) Appl. No.: 13/378,621

(22) PCT Filed: May 26, 2010

(86) PCT No.: PCT/JP2010/058899
§ 371 (c)(1),
(2), (4) Date: Dec. 15, 2011

(87) PCT Pub. No.: WO2010/146977
PCT Pub. Date: Dec. 23, 2010

(65) Prior Publication Data
US 2012/0094063 A1  Apr. 19, 2012

(30) Foreign Application Priority Data
Jun. 19, 2009  (JP) .................... 2009-146877

(51) Int. Cl.
*B23H 5/00*  (2006.01)
*C23C 4/02*  (2006.01)
(Continued)

(52) U.S. Cl.
CPC ............. *C23C 4/02* (2013.01); *B23K 26/0078* (2013.01); *B23K 26/0093* (2013.01);
(Continued)

(58) Field of Classification Search
CPC .............. B23K 26/0078; B23K 26/367; B23K 26/0093
(Continued)

(56) References Cited

U.S. PATENT DOCUMENTS 4,743,729 A  5/1988  Beal
5,894,053 A  4/1999  Fried
(Continued)

FOREIGN PATENT DOCUMENTS

CN  1159520 C  7/2004
EP  0 716 158 A1  6/1996
(Continued)

OTHER PUBLICATIONS

Russian Decision on Grant and English translation dated Jul. 11, 2014; (18 pages).
Chinese Office Action dated Nov. 4, 2013, (11 pgs.).

*Primary Examiner* — Phuong Nguyen
(74) *Attorney, Agent, or Firm* — Foley & Lardner LLP

(57) ABSTRACT

A boring cutter body (5) is inserted into a circular hole (3) and is rotated and moved in an axial direction, whereby screw-shaped groove parts (11) are formed by using a tool bit (9) provided on a tip end of an outer peripheral portion, and broken surfaces (15) are formed by breaking tips of ridge parts generated by formation of the groove parts (11). Moreover, the groove parts (11) are processed through electric discharge machining using a wire electrode (17) provided to the boring cutter body (5) behind the tool bit (9) in the rotating direction, thereby forming finely roughened portions (41) having more finely roughened shapes than the broken surfaces (15).

9 Claims, 17 Drawing Sheets

(51) Int. Cl.
*B23K 26/00* (2014.01)
*F02F 1/00* (2006.01)

(52) U.S. Cl.
CPC .............. *B23K 26/364* (2015.10); *F02F 1/00* (2013.01); *F05C 2253/12* (2013.01); *Y10T 428/2457* (2015.01); *Y10T 428/24281* (2015.01)

(58) Field of Classification Search
USPC ....... 83/875, 851, 686, 733; 219/72, 121.68, 219/121.84, 121.14, 69.15, 69.17; 92/169.1
See application file for complete search history.

(56) References Cited

U.S. PATENT DOCUMENTS

| | | | |
|---|---|---|---|
| 6,449,123 B1* | 9/2002 | Tsujimoto | C04B 35/117 216/102 |
| 6,622,685 B2 | 9/2003 | Takahashi et al. | |
| 2003/0010201 A1 | 1/2003 | Takahashi et al. | |
| 2005/0258136 A1* | 11/2005 | Kawanishi et al. | 216/54 |
| 2008/0245227 A1 | 10/2008 | Iizumi et al. | |
| 2008/0289958 A1* | 11/2008 | Kardokus et al. | 204/298.12 |
| 2010/0031799 A1* | 2/2010 | Ast et al. | 83/875 |
| 2010/0229385 A1* | 9/2010 | Higuma et al. | 29/888.4 |

FOREIGN PATENT DOCUMENTS

| | | |
|---|---|---|
| JP | 2001-314986 A | 11/2001 |
| JP | 2002-276662 A | 9/2002 |
| JP | 3780840 B2 | 5/2006 |
| RU | 2 132 402 C1 | 6/1999 |
| RU | 2 209 256 C2 | 7/2003 |

* cited by examiner (a)

(b)

(a)

(b)

(a)

(b)

PRESPRAY PROCESSING METHOD

TECHNICAL FIELD

The present invention relates to a prespray processed form, a prespray processing method and a prespray processing apparatus with which a surface of a member is formed into a rough surface by preprocessing for forming a thermal spray coating.

BACKGROUND ART

In order to form a thermal spray coating on an inner surface of a cylinder bore of a linerless aluminum cylinder block effective for reducing weight and exhaust treatment of an automobile engine, the inner surface of the cylinder bore needs to be roughened in prespray processing for the purpose of enhancing adhesion of the thermal spray coating.

According to Japanese Patent No. 3780840, an inner surface of a cylinder bore is processed through boring processing and thereby is formed into roughened portions in a screwed-shape while the tips of ridge parts being protruding parts of the roughened portions in the screwed-shape are cut off and formed to have a broken surface of finer roughened portions.

SUMMARY OF INVENTION

Technical Problem

However, in the conventional prespray processed form processed into a rough surface as described above, the tips of the ridge parts are finely roughened to be the broken surfaces, but the insides of the groove parts are not finely roughened. Hence there is a demand for further improvement in adhesion.

Accordingly, it is an object of the present invention to further enhance adhesion of a thermal spray coating onto a surface of a member.

Solution to Problem

A first aspect of the present invention is to provide a prespray processed form in which groove parts and ridge parts are alternately formed on a surface of a member where a thermal spray coating is to be formed, and broken surfaces are formed on tips of the ridge parts, wherein finely roughened portions finer than the broken surfaces formed on the tips of the ridge parts are formed at the groove parts.

A second aspect of the present invention is to provide a prespray processing method including: a broken surface forming step of using a cutting tool to form groove parts on a surface of a member where a thermal spray coating is to be formed while forming broken surfaces on tips of ridge parts generated by formation of the groove parts; and a finely roughened portion forming step of forming finely roughened portions, which are finer than the broken surfaces formed on the tips of the ridge parts, at the groove parts by using a finely roughened portion forming device.

A third aspect of the present invention is to provide a prespray processing apparatus including a finely roughened portion forming device configured to form finely roughened portions in a shape in which groove parts and ridge parts are alternately formed on a surface of a member where a thermal spray coating is to be formed, and broken surfaces are formed on tips of the ridge parts, the finely roughened portions being formed at the groove parts and finer than the broken surfaces formed on the tips of the ridge parts.

DESCRIPTION OF EMBODIMENTS

Embodiments of the present invention will be described below based on the accompanying drawings.

First Embodiment

Figure 1:
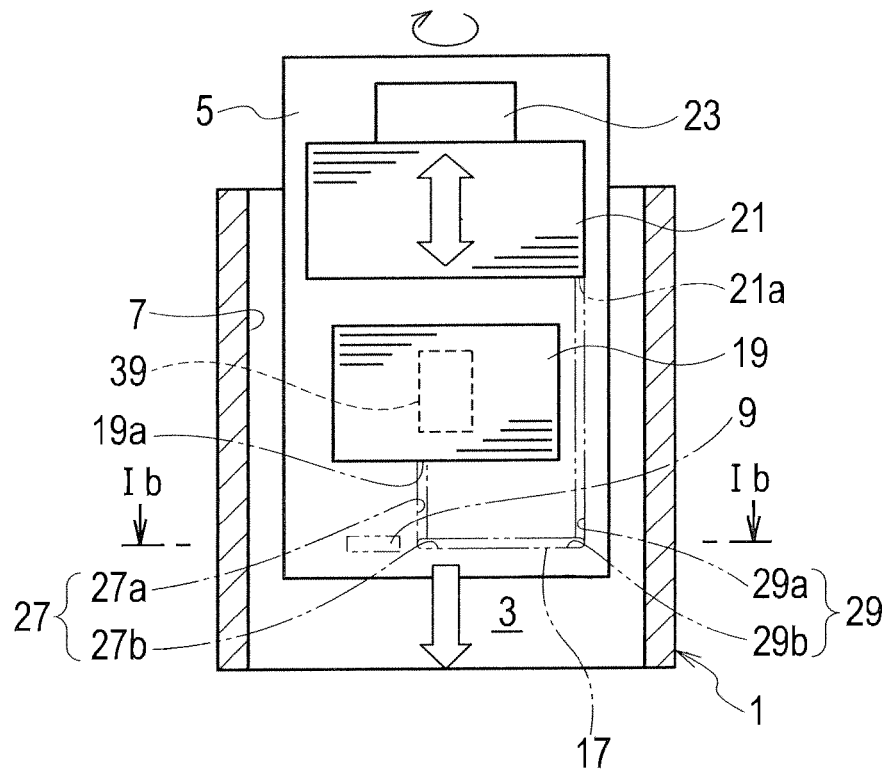
FIG. 1 is a view showing a prespray processing apparatus according to a first embodiment of the present invention, in which part (a) is a cross-sectional view of the prespray processing apparatus and part (b) is a cross-sectional view taken along a Ib-Ib line in part (a).
Figure 1:
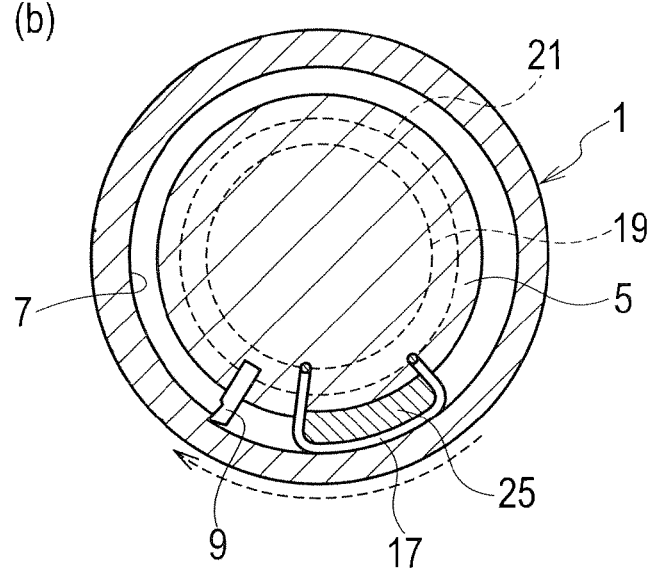

In a first embodiment, as shown in FIG. 1, a boring cutter body 5 serving as a main body of a processing tool is inserted while being rotated into a circular hole (or a cylindrical hole) 3 on a work 1. Thus, a surface roughening process is carried out on an inner surface 7 being a surface of a member of the circular hole 3 on which a thermal spray coating is to be formed. A thermal spray coating of an iron-type metal material is formed on the process target surface after the surface roughening process is carried out.

Here, the work 1 may be a cylinder block formed of an aluminum alloy (a JIS ADC 12 material) for an automobile engine, for example. Therefore, the circular hole 3 constitutes a cylinder bore.

A tool bit 9 as a cutting tool is fitted on a tip outer peripheral portion of the boring cutter body 5. JIS K10 is used as the material of the tool bit 9, for example. Accordingly, the boring cutter body 5 is inserted into the circular hole 3 and is moved in an axial direction while being rotated, thereby forming groove parts 11 shown in FIG. 4. These groove parts 11 are formed into screw-shaped spiral grooves so as to extend along a circumferential direction. Here, ridge parts 13 are formed between the groove parts 11. As also disclosed in the above-mentioned Japanese Patent No. 3780840, these ridge parts 13 are provided with broken surfaces 15 formed by ripping some of tips thereof with the tool bit 9 or by chips generated at the time of cutting.

Specifically, in a prespray processed form of this embodiment, the groove parts 11 and the ridge parts 13 are alternately formed on the inner surface 7 of the circular hole 3 which is the surface of the member on which the thermal spray coating is to be formed, and tips of the ridge parts 13 are formed to have the broken surfaces 15 finer than concavo-convex shaped portions formed of the groove parts 11 and the ridge parts 13 (the broken surfaces more finely roughened than the concavo-convex shaped portions).

At the tip outer peripheral portion of the boring cutter body 5 shown in the aforementioned FIG. 1, a wire electrode 17 serving as an electrode for electrical discharge machining is provided as a finely roughened portion forming device. The wire electrode 17 is located in a position behind the above-described tool bit 9 in the circumferential direction and in a rotating direction of the boring cutter body 5.

The wire electrode 17 is wound around a feed rotating reel 19 serving as a wire feeding unit provided inside the boring cutter body 5. The wire electrode 17 is sequentially fed from this feed rotating reel 19 to a processing region while wire electrode 17 used for processing is wound around and collected by a collection rotating reel 21 serving as a wire collecting unit provided on a base side inside the boring cutter body 5. Although it is not particularly limited, the wire electrode 17 is made of brass in this embodiment and a diameter thereof may be around 0.1 mm.

The feed rotating reel 19 and the collection rotating reel 21 have rotation centers which coincide with a rotation center of the boring cutter body 5. A motor 23 serving as a driver configured to rotate and drive the collection rotating reel 21 is provided at an upper part of the collection rotating reel 21.

Figure 2:
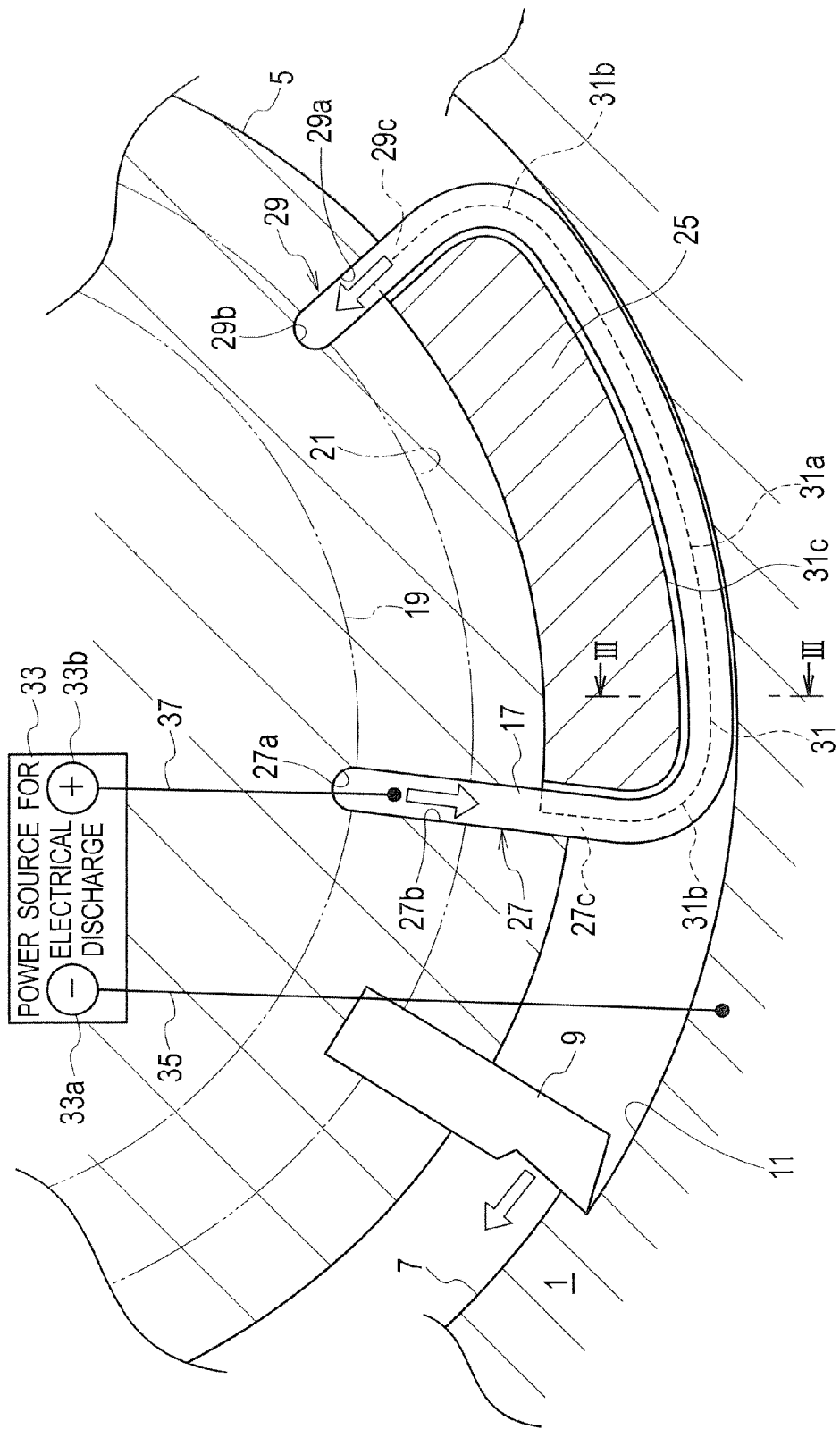
FIG. 2 is an enlarged cross-sectional view of substantial part in FIG. 1 part (b).

As enlarged and shown in FIG. 2, the above-described wire electrode 17 is guided by a wire electrode guide 25 serving as a guide member, which is fitted in the position behind the tool bit 9 in the circumferential direction and in the rotating direction of the boring cutter body 5. That is, the wire electrode 17 is sequentially fed from the feed rotating reel 19 to the collection rotating reel 21 by way of the wire electrode guide 25.

Therefore, a feed side guide hole 27 where the wire electrode 17 moves is provided on a path from the feed rotating reel 19 to the wire electrode guide 25 in the boring cutter body 5, and a collection side guide hole 29 where the wire electrode 17 moves is provided on a path from the wire electrode guide 25 to the collection rotating reel 21 therein.

The feed side guide hole 27 includes an axial direction hole 27a having one end opened at a wire extracting portion 19a of the feed rotating reel 19 and extending in an axial direction of the boring cutter body 5, and a radial direction hole 27b having one end communicated with the other end (a lower end in FIG. 1(a)) of the axial direction hole 27a and another end opened on a surface of the boring cutter body 5. Another end opening 27c (FIG. 2) of this axial direction hole 27a corresponds to one end of the wire electrode guide 25 located on the left side in FIG. 2.

Meanwhile, the collection side guide hole 29 includes an axial direction hole 29a having one end opened at a wire extracting portion 21a of the collection rotating reel 21 and extending in an axial direction of the boring cutter body 5, and a radial direction hole 29b having one end communicated with the other end (a lower end in FIG. 1(a)) of the axial direction hole 29a and another end opened on a surface of the boring cutter body 5. Another end opening 29c (FIG. 2) of this radial direction hole 29b corresponds to another end of the wire electrode guide 25 located on the right side in FIG. 2.

Figure 3:
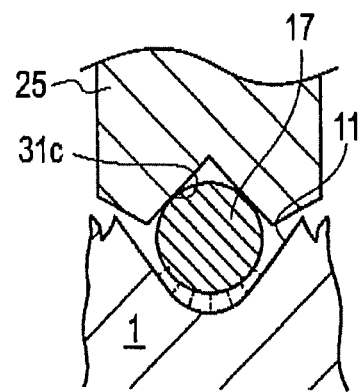
FIG. 3 is a cross-sectional view taken along a III-III line in FIG. 2.

An outer peripheral surface 31 of the wire electrode guide 25 includes a tip end surface 31a in a convex curved shape having a curvature substantially equal to that of the inner surface 7 of the circular hole 3 and being located close to the inner surface 7, and two side surfaces 31b in a convex curved shape being formed continuously with both ends of the tip end surface 31a and having a smaller curvature than that of the tip end surface 31a. Moreover, a guide groove 31c allowing entry of a portion substantially equivalent to a radius of the wire electrode 17 is formed across the tip end surface 31a and both of the side surfaces 31b of this outer peripheral surface 31. This guide groove 31c is formed substantially into a V-shaped, for example, as shown in FIG. 3 that represents a cross-sectional view taken along a III-III line in FIG. 2.

Then, a negative terminal 33a of a power source 33 for electrical discharge machining is connected to an appropriate region of the work 1 formed of a conductive material by use of a wire 35 and a positive terminal 33b of the power source 33 is connected to the wire electrode 17 by use of a wire 37.

Here, electrical connection between the wire 37 connected to the above-described power source 33 for electrical discharge machining and the wire electrode 17 may be established by providing an annular electrode terminal electrically connected to the wire electrode 17 on an outer peripheral surface or the like of the boring cutter body 5, for example, and causing a current-collecting brush provided at an end portion of the wire 37 to slide on this electrode terminal. An electrode terminal and a current-collecting brush similar to those described above may also be used for power distribution to the motor 23.

Meanwhile, the feed rotating reel 19 includes a tension providing mechanism 39 serving as a tension provider configured to provide tension when the wire electrode 17 is extracted. This tension providing mechanism 39 may employ a mechanism similar to one configured to provide tension to a fishing line extracted from a reel on a fishing rod, for example.

In the meantime, the collection rotating reel 21 is rendered reciprocable in the axial direction inside the boring cutter body 5 together with the motor 23. In this way, the wire electrode 17 sequentially collected from an upper end of the axial direction hole 29a of the collection side guide hole 29 is wound evenly in the entire axial direction around the collection rotating reel 21.

A mechanism for moving the collection rotating reel 21 in the axial direction employs a structure, which is provided with a bumpy cam surface in an undulation shape along a circumferential direction on one of surfaces in the axial direction of the collection rotating reel 21, for example. In addition, the structure is configured to cause a pressing protrusion provided so as to protrude from one side in the axial direction of the boring cutter body 5 to slidably press on this bumpy cam surface, while causing another end in the axial direction of the collection rotating reel 21 to press against another side in the axial direction of the boring cutter body 5 by way of an elastic member such as a spring. In this way, the collection rotating reel 21 is reciprocated in the axial direction relative to the boring cutter body 5 with rotation relative to the boring cutter body 5.

At this time, resistance during rotation of the collection rotating reel 21 is reduced by interposing a member having small friction resistance such as a bearing between the elastic member such as the aforementioned spring and either the other side in the axial direction of the boring cutter body 5 or the collection rotating reel 21.

The boring cutter body 5 incorporating the feed rotating reel 19 and the collection rotating reel 21 as described above is configured to render the respective rotating reels 19 and 21 attachable to and detachable from the inside of the boring cutter body 5 by employing a structure to split the respective rotating reels vertically into two pieces in FIG. 1(*a*), for example.

Meanwhile, insertion of the wire electrode 17 into the feed side guide hole 27 and the collection side guide hole 29 can be dealt with by employing a structure which can further split the boring cutter body 5 vertically in FIG. 1(*a*) at portions corresponding to the radial direction hole 27b and the radial direction hole 29b, for example, so as to expose the radial direction hole 27b and the radial direction hole 29b to outside.

Figure 4:
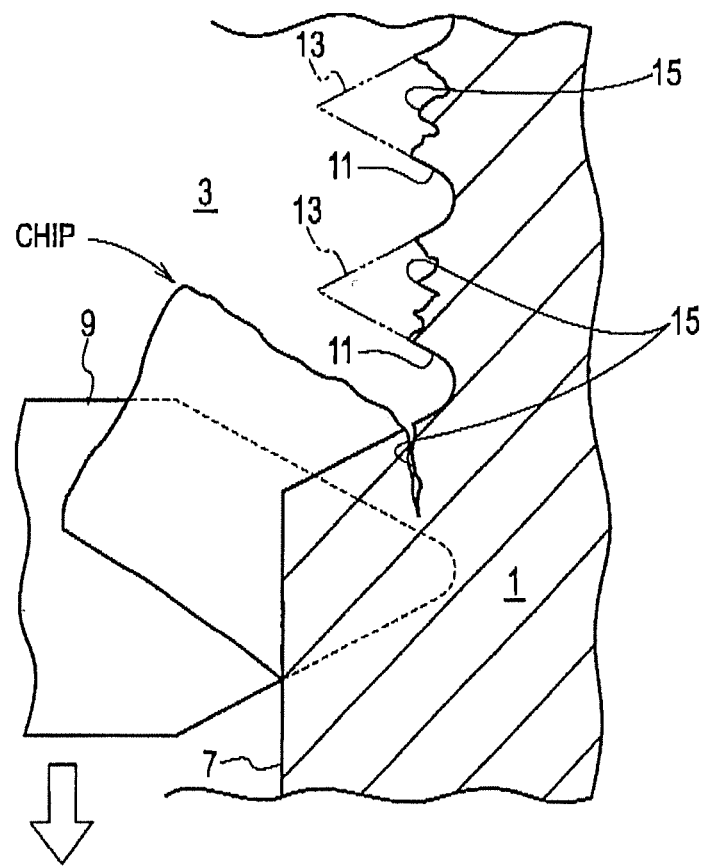
FIG. 4 is an operation explanatory view showing a state of forming spiral groove parts and broken surfaces with a tool bit of the prespray processing apparatus of FIG. 1.

Next, operations of the first embodiment will be described. The boring cutter body 5 is inserted into the circular hole 3 and processing is carried out by setting the number of revolutions at 2000 rpm and a feeding speed in the axial direction at 0.2 mm/rev, for example. At this time, the groove parts 11 made of the screw-shaped spiral grooves are firstly formed by use of the tool bit 9 as shown in FIG. 2 and FIG. 4.

In this case, the ridge parts 13 are formed along the axial direction (a direction orthogonal to the sheet surface in FIG. 2, a vertical direction in FIG. 4) between the groove parts 11 as described previously. These ridge parts 13 are provided with the broken surfaces 15 formed on these ridge parts 13 by ripping some of the tips thereof with the tool bit 9 or by chips generated at the time of cutting. These broken surfaces 15 are formed finer than the concavo-convex shaped portions comprised of the groove parts 11 and the ridge parts 13 described above.

Figure 5:
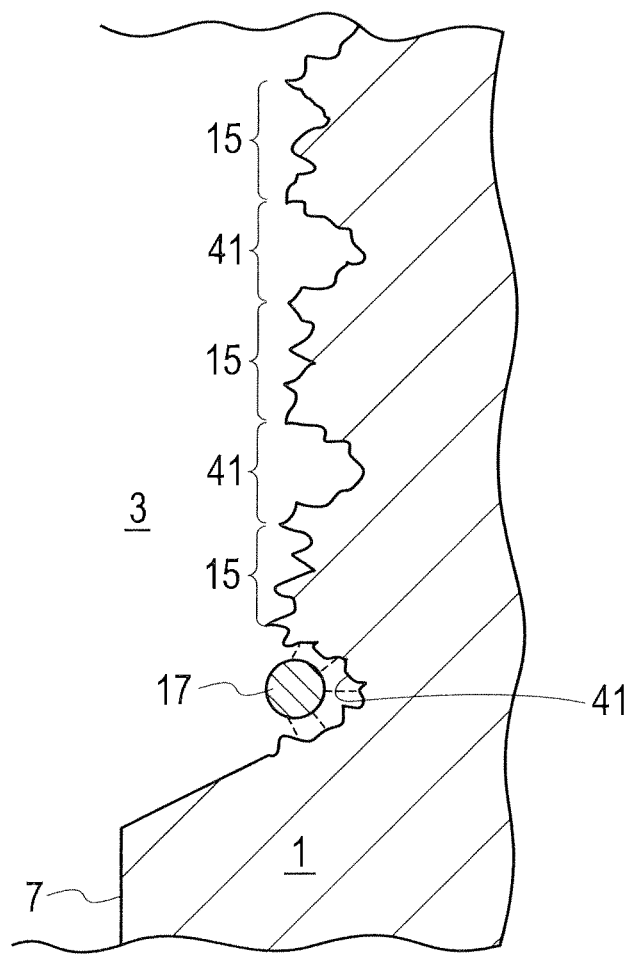
FIG. 5 is an operation explanatory view showing a state of forming finely roughened portions on the groove parts in FIG. 4 by electrical discharge machining.

At the time of a cutting process using the tool bit 9, the wire electrode 17 located close to and behind the tool bit 9 in the rotating direction of the boring cutter body 5 is positioned inside the groove part 11 as shown in FIG. 3. Finely roughened portions 41 are formed substantially in the entire groove parts 11 as shown in FIG. 5 as the power source 3 for electrical discharge machining applies a voltage between this wire electrode 17 and the work 1.

In this way, the finely roughened portions 41 are formed by subjecting the surface of the member to machining processes twice. To be more precise, the finely roughened portions 41 are formed by subjecting the surface of the member to a cutting process (a first machining process) with a cutting edge of the tool bit 9 and to electrical discharge machining (a second machining process) with the wire electrode 17. Here, in this specification, the machining process encompasses not only actions including a cutting process, a grinding process, a rolling process, and the like which are carried out while causing a tool to directly contact the surface of the member, but also actions including electrical discharge machining of this embodiment or laser processing to be described later, which are carried out in a noncontact state between a tool and the surface of the member.

The finely roughened portions 41 of the groove parts 11 described above are formed finer than the broken surfaces 15 of the convex portions 15 formed at the time of the cutting process with the tool bit 9. To achieve the above-described fine processing, the wire electrode 17 serving as a discharging electrode is positioned at a longer distance from a surface of the groove parts 11 as a process target surface and also set at a higher applied voltage than those in usual electrical discharge machining.

In usual electrical discharge machining, the process target surface is processed into a smooth surface by bringing the discharging electrode closer to the process target surface and setting the applied voltage smaller. On the other hand, since such a smooth surface is unnecessary in this embodiment, it is possible to form the process target surface into the extremely finely roughened shape by setting the higher voltage and increasing a discharge gap.

When the finely roughened portions 41 are formed as described above, the wire electrode 17 is sequentially fed from the feed rotating reel 19 by driving the motor 23 and is guided by the wire electrode guide 25 at the time of electrical discharge machining at the groove parts 11, and is then wound around and collected by the collection rotating reel 21.

The formation of the broken surfaces 15 at the tips of the ridge parts 13 by the cutting process with the tool bit 9 and the formation of the finely roughened portions 41 at the groove parts 11 by electrical discharge machining with the wire electrode 17 as described above are carried out substantially across the entire inner surface 7 of the cylindrical hole 3 shown in FIG. 1. After completion of the processes, the boring cutter body 5 is moved in a direction so as to cause the tool bit 9 and the wire electrode 17 to recede from the process target surface (upward in FIG. 1(*b*)) while rotation thereof is stopped, and is then pulled outward from the circular hole 3.

Figure 6:
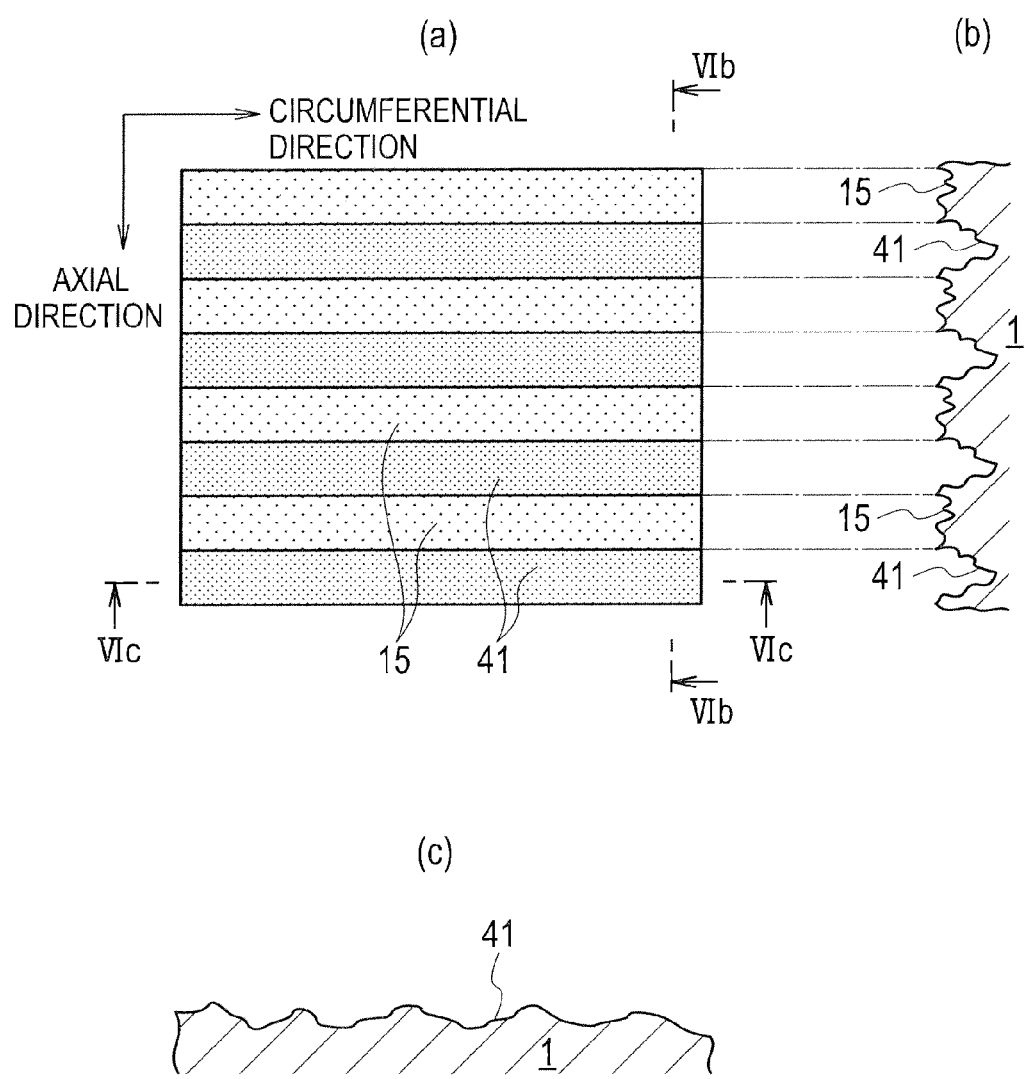
FIG. 6 is a view showing part of an inner surface of a circular hole after a surface roughening process, in which part (a) is a development view, part (b) is a cross-sectional view taken along a VIb-VIb line in part (a), and part (c) is a cross-sectional view taken along a VIc-VIc line in part (a).

FIG. 6(*a*) is a development view of part of the inner surface 7 of the circular hole 3 after the surface roughening process. As shown in FIG. 6(*b*), the broken surfaces 15 and the finely roughened portions 41 are alternately formed along the axial direction on the surface after the process. Meanwhile, as shown in FIG. 6(c), the finely roughened portions are also formed along the circumferential direction at the finely roughened portions 41. Of course, as for the broken surfaces 15 as well, broken surfaces that are similar to those in the axial direction are naturally formed along the circumferential direction although not illustrated therein in particular.

Here, surface roughness of the broken surfaces 15 at the tips of the ridge parts 13 described above is set to Rz (ten-point average roughness)=25 µm and Rmax (maximum height)=40 µm to 50 µm, while surface roughness of the finely roughened portions 41 at the groove parts 11 is set to Rz (ten-point average roughness)=4 µm to 7 µm and Rmax (maximum height)=10 µm to 12 µm.

As described above, in this embodiment, the tips of the ridge parts 13 are subjected to surface roughening by forming the broken surfaces 15 by means of the cutting process with the tool bit 9 and the groove parts 11 formed by the cutting process are also subjected to surface roughening by forming the finely roughened portions 41 by means of electrical discharge machining. Accordingly, it is possible to enhance adhesion of the thermal spray coating 43 (FIG. 7) to be subsequently formed as compared to the case where the groove parts 11 are not subjected to surface roughening.

Figure 7:
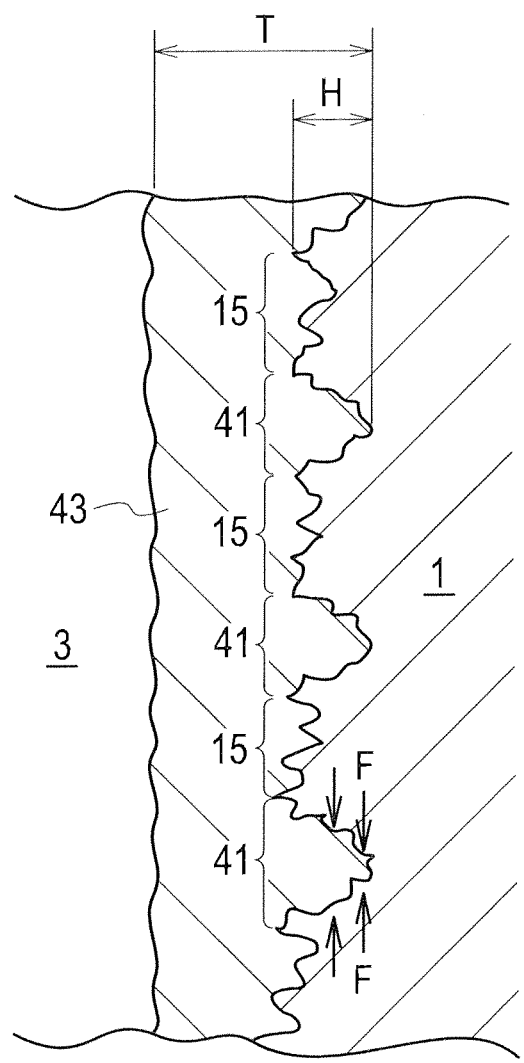
FIG. 7 is an operation explanatory view showing adhesion of a thermal spray coating formed after the surface roughening process.
Figure 8:
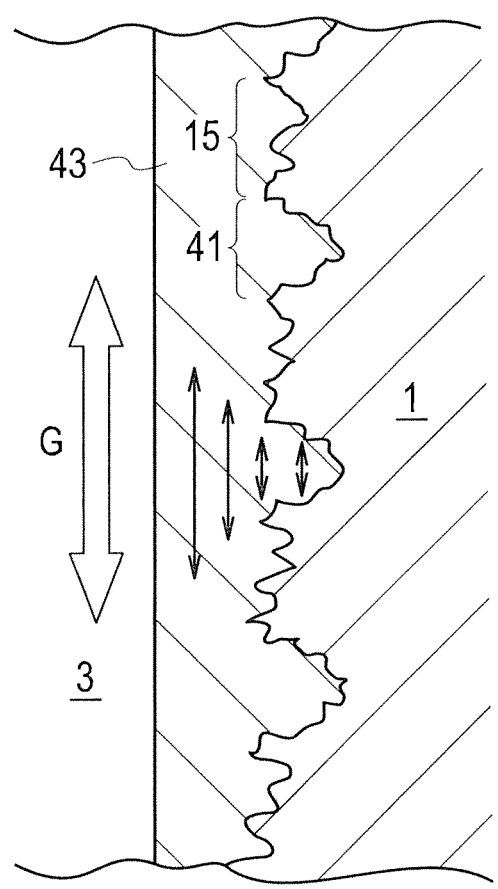
FIG. 8 is an operation explanatory view showing an aspect when an external force acts on the thermal spray coating in an axial direction of the circular hole.

In this case, as shown in FIG. 7, the finely roughened portions 41 behave so as to pinch the thermal spray coating 43 that enters the groove parts 11, from both sides and to bite into the thermal spray coating 43 as indicated with arrows F. Hence it is possible to further enhance adhesion of the thermal spray coating 43. Moreover, the finely roughened portions 41 are formed entirely on the groove parts 11. Accordingly, when an external force G along the axial direction of the circular hole 3 is applied to the thermal spray coating 43 as shown in FIG. 8, there are fewer regions constituting starting points of detachment particularly in comparison with the case where the finely roughened portions 41 are formed only on side surfaces of the groove parts 11. Hence it is effective for suppressing detachment of the thermal spray coating 43.

Here, when the thermal spray coating 43 is formed, granular thermal spray droplets go into fine recessed portions at the broken surfaces 15 and the finely roughened portions 41 by fusing a thermal spray material into granules and spraying the material on the process target surface. In this way, the thermal spray coating 43 adheres to the broken surfaces 15 and the finely roughened portions 41 at a grain level of the thermal spray material (in the form of the above-described granular thermal spray droplets), which is extremely effective for enhancing adhesion.

Since adhesion of the thermal spray coating 43 is further enhanced as described above, it is possible to lower a maximum crest height (a height of the ridge parts 13) H as shown in FIG. 7 and to reduce a film thickness of the thermal spray coating 43 correspondingly, thereby reducing a usage amount of the thermal spray material and achieving cost reduction.

Here, in this embodiment, the finely roughened portions 41 at the groove parts 11 are refined into the more finely roughened portions than the broken surfaces 15 at the ridge parts 13. In this way, it is possible to suppress removal of a large portion of the ridge parts 13 from a base end and thereby to ensure strength at the base end thereof. When the finely roughened portions 41 are formed as rough as or rougher than the broken surfaces 15 at the ridge parts 13, a large portion of the ridge parts 13 might be removed from the base end whereby the strength at the base end of the ridge parts 13 is degraded. As a result, if the thermal spray coating 43 that adheres at high adhesion receives a force so as to be peeled off, the ridge parts 13 may be broken at the base end since this thermal spray coating 43 is not peeled off because of the high adhesion.

Therefore, in this embodiment, it is possible to suppress such breakdown by enhancing adhesion of the thermal spray coating 43 and ensuring the strength at the base end of the ridge parts 13 at the same time.

Meanwhile, in this embodiment, the finely roughened portions 41 formed at the groove parts 11 are formed along the circumferential direction. Accordingly, it is effective to suppress detachment of the thermal spray coating 43 at the time of a honing process to be carried out as a finishing process after formation of the thermal spray coating 43. In the honing process, a honing head provided with grind stone is pressed against the process target surface (a thermal spray coating surface) and is rotated along the circumferential direction. Hence the thermal spray coating 43 receives a force that drags in the circumferential direction.

Further, it is possible to suppress detachment of the thermal spray coating at the time of reciprocation of a piston by using the work 1 as the cylinder block and forming the finely roughened portions 41 on the inner surface of the cylinder bore. Moreover, as a piston ring is rotated in the circumferential direction relative to the cylinder bore, it is possible to suppress detachment of the thermal spray coating 43 attributable to rotation of the piston ring by forming the finely roughened portions 41 along the circumferential direction as described above.

As the adhesion of the thermal spray coating 43 is enhanced, it is possible to suppress occurrence of a gap between the thermal spray coating 43 and an aluminum base material side constituting the process target surface when the work 1 is used as the cylinder block. Hence, there are contributions to improvement in engine performances including an improvement in a cooling performance of the engine (a combustion chamber), a promising improvement in an intake air filling efficiency attributable to an improvement in knocking resistance or a temperature drop of the intake air, and so forth.

Here, in the above-described embodiment, the finely roughened portions 41 are formed almost on the entire region of the groove parts 11. However, it is also possible to form the finely roughened portions 41 at least at bottom portions of the groove parts 11, instead. In this case, it is possible to employ a device such as locating the wire electrode 17 in a position closer to the bottom portions of the groove parts 11 or reducing the diameter of the wire electrode 17 to be used, for example.

As described above, when the finely roughened portions 41 are formed only at the groove parts 11, it is possible to effectively suppress detachment of the thermal spray coating 43 upon application of an external force so as to peel the thermal spray coating 43 off the inner surface 7 of the circular hole 3 in a separating direction, as compared to the case where the finely roughened portions 41 are formed only on the side surfaces of the groove parts 11.

In addition, electrical discharge machining is utilized for forming the finely roughened portions 41. Accordingly, it is possible to carry out the process at less expensive equipment as compared to the case of utilizing a laser beam, for example.

Moreover, the wire electrode 17 is used as the electrode for the above-described electrical discharge machining. Accordingly, it is possible to easily form the finely roughened portions 41 substantially in the entire region of the groove parts 11 as shown in FIG. 5 by allowing this wire electrode 17 to go into the groove parts 11.

Meanwhile, in this embodiment, the tool bit 9 and the wire electrode 17 are fitted on the boring cutter body 5 serving as the main body and the boring cutter body 5 is inserted into the circular hole 3 and is rotated relatively. Accordingly, the finely roughened portions 41 are formed continuously on the groove parts 11 with the wire electrode 17 immediately after the groove parts 11 and the broken surfaces 15 are formed with the tool bit 9. That is, in this embodiment, the processing of the groove parts 11 and the broken surfaces 15 and the processing of the finely roughened portions 41 are carried out by using the single processing equipment.

For this reason, it is possible to enhance operating efficiency as compared to the case where the finely roughened portions 41 are formed using different equipment from the equipment for processing the groove parts 11 and the broken surfaces 15, and to easily achieve positioning of the wire electrode 17 relative to the groove parts 11. Hence enhancement of the operating efficiency makes effective processing.

Meanwhile, in this embodiment, when the wire electrode 17 is moved inside the groove parts 11 along the circumferential direction thereof, the wire electrode 17 is sequentially fed out from the feed rotating reel 19 serving as the wire feeding unit provided inside the boring cutter body 5 into the groove parts 11, and the wire electrode 17 used for processing is collected by using the collection rotating reel 21 serving as the wire collecting unit provided inside the boring cutter body 5.

Accordingly, it is possible to continue processing the inner surface 7 of the circular hole 3 by sequentially replacing the wire electrode 17 worn by processing with a new one, and thereby to form the finely roughened portions 41 efficiently on the entire inner surface 7. Moreover, since the feed rotating reel 19 and the collection rotating reel 21 are housed inside the boring cutter body 5, it is not necessary to employ a structure configured to feed the wire electrode 17 from outside. Hence operability when the tool bit 9 is replaced by using an automatic tool changer, for example, is enhanced.

In this case, the wire feeding unit and the wire collecting unit are formed of the feed rotating reel 19 and the collection rotating reel 21 having the rotation centers coinciding with the rotation center of the boring cutter body 5. For this reason, the position of the rotation center remains almost in a constant position when the boring cutter body 5 is rotated particularly at a high speed. Hence it is possible to carry out the stable processing while appropriately maintaining the tool balance.

Meanwhile, in this embodiment, the wire electrode 17 is wound around the collection rotating reel 21 with the motor 23 and the wire electrode 17 in the guided state by the wire electrode guide 25 is provided with tension by the tension providing mechanism 39. Accordingly, it is possible to maintain a positional relationship of the wire electrode 17 with the process target surface of the groove parts 11 almost at a constant level, and thereby to carry out electrical discharge machining at high accuracy.

Further, in this embodiment, the tool bit 9 and the wire electrode 17 are located within an angular range of about 90 degrees along the circumferential direction of the boring cutter body 5 as shown in FIG. 1(*b*). In this case, when the boring cutter body 5 is inserted into the circular hole 3 and is pulled out of the circular hole 3 after the processing is completed, the boring cutter body 5 is moved to the opposite side of the side on which the tool bit 9 and the wire electrode 17 are fitted, so as to move the tool bit 9 and the wire electrode 17 away from the process target surface. In this way, it is possible to suppress damages on the surface after the processing particularly due to contact of the tool bit 9.

Second Embodiment

Figure 9:
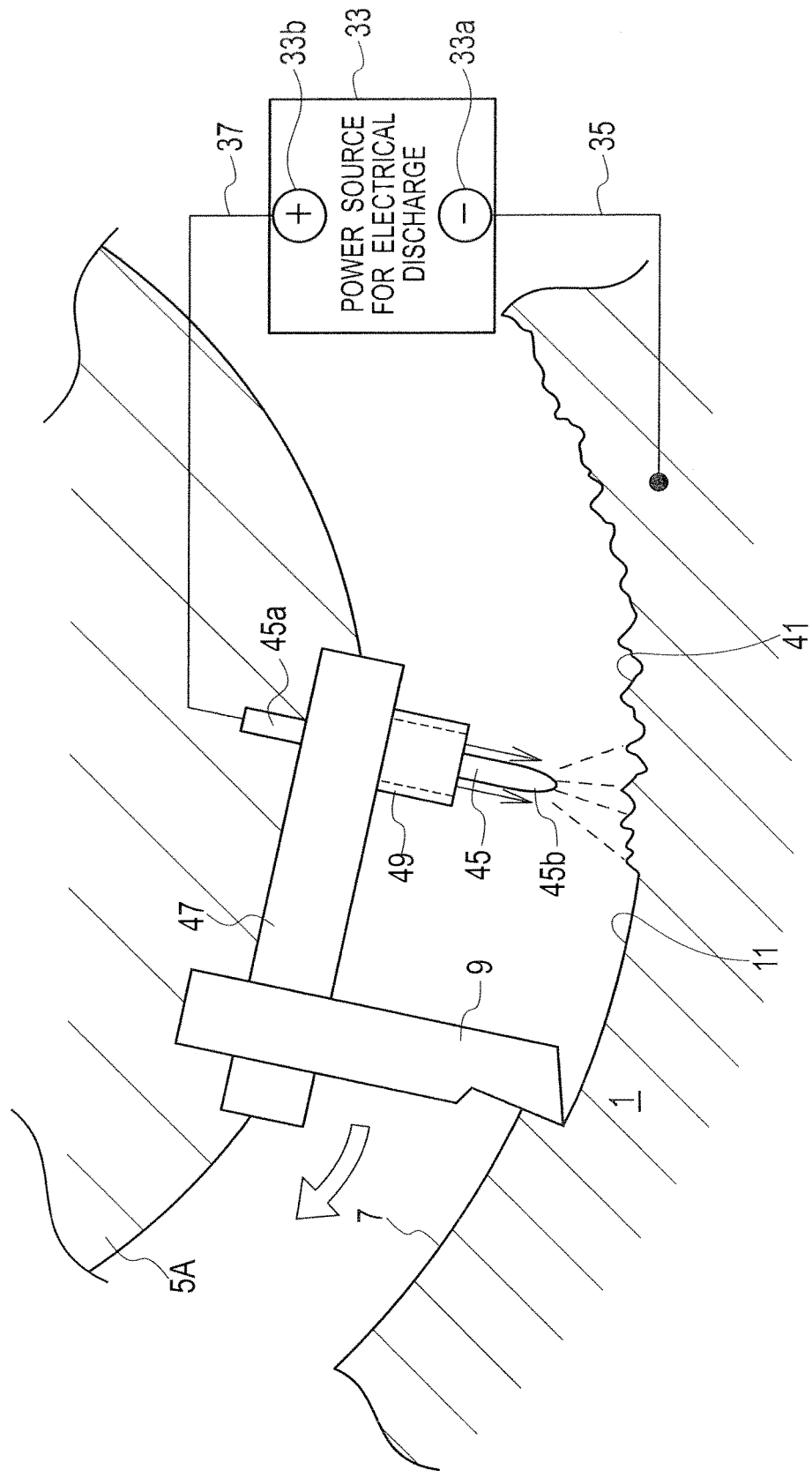
FIG. 9 is a cross-sectional view corresponding to FIG. 2, which shows a second embodiment of the present invention.

As shown in FIG. 9, a second embodiment employs a rod electrode 45 as the electrode for electrical discharge machining instead of the wire electrode 17 used in the above-described first embodiment. A base end portion 45*a* side of the rod electrode 45 is fitted on a holder member 47 as a fitting made of an insulative material, while a tip end portion 45*b* thereof is located inside the groove part 11.

The holder member 47 is fitted on an outer peripheral portion of a boring cutter body 5A as a main body of a processing tool along a rotating direction thereof. The rod electrode 45 is fitted on an end portion on a rear side in a rotating direction of this holder member 47 while the tool bit 9 is fitted on an end portion on a front side in the rotating direction.

The base end portion 45*a* of the rod electrode 45 protrudes from the holder member 47 toward the boring cutter body 5A on the opposite side of the tip end portion 45*b*. The wire 37 to be connected to the positive terminal 33*b* of the power source 33 for electrical discharge machining is connected to this base end portion 45*a* while the negative terminal 33*a* is connected to the work 1 made of a conductive material, by using the wire 35 as similar to the first embodiment.

Here, concerning the wire 37 to be connected to the positive terminal 33*b* in this case as well, an annular electrode terminal electrically connected to the base end portion 45*a* of the rod electrode 45 may be provided on the outer peripheral surface or the like of the boring cutter body 5A, and a current-collecting brush provided at the end portion of the wire 37 may be allowed to slide on this electrode terminal as similar to the first embodiment.

Meanwhile, a machining fluid guide 49 made of a hollow cylindrical member is fitted in a space with the rod electrode 45 in a position close to the holder member 47 on the tip end portion 45*b* side of the rod electrode 45 so as to define a clearance therebetween, and an electrical discharge machining fluid is fed from outside into this clearance. The electrical discharge machining fluid is assumed to be fed from a center at a rear end of a machining center configured to rotatably support the boring cutter body 5A into the boring cutter body 5A and then to be fed from an electrical discharge machining fluid passage formed inside the boring cutter body 5A as appropriate into the machining fluid guide 49 through the holder member 47.

Next, operations of the second embodiment will be described. The boring cutter body 5A is inserted into the circular hole 3 and is moved in the axial direction while being rotated as similar to the first embodiment, thereby forming the groove parts 11 made of the screw-shaped spiral groove. As shown in FIG. 4 described above, the ridge parts 13 formed at this time include the broken surfaces 15 which are finer than the concavo-convex shaped portions including the groove parts 11 and the ridge parts 13.

Figure 10:
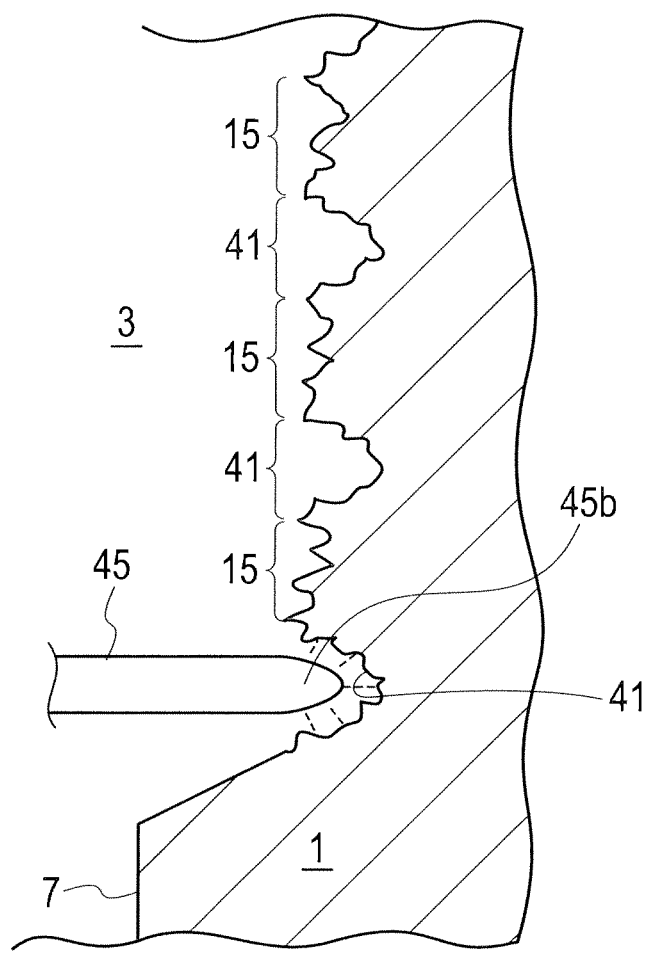
FIG. 10 is an operation explanatory view showing a state of forming finely roughened portions by use of a rod electrode of the second embodiment.

At the time of the cutting process with the above-described tool bit 9, the tip end portion 45*b* of the rod electrode 45 located close to and behind the tool bit 9 in the rotating direction of the boring cutter body 5A is located inside the groove part 11 as shown in FIG. 10. The finely roughened portions 41 are formed substantially across the entire groove parts 11 by applying the voltage from the power source 33 for electrical discharge machining to the space between this rod electrode 45 and the work 1.

As similar to the first embodiment, the finely roughened portions 41 described above are more finely roughened and formed finer than the broken surfaces 15 that are the roughened portions of the convex portions 15 formed at the time of the cutting process with the tool bit 9. To achieve the above-described fine processing, the rod electrode 45 serving as a discharging electrode is positioned at a longer distance from a surface of the groove parts 11 as a process target surface and also set at a higher applied voltage than those in usual electrical discharge machining.

In this embodiment, when the above-described finely roughened portions 41 is subjected to electrical discharge machining, the electrical discharge machining fluid is fed to the neighborhood of the rod electrode 45 through the cylindrical member 49. It is possible to feed the electrical discharge machining fluid easily to the neighborhood of the electrode by forming the discharging electrode into the rod shape, to discharge a waste fluid easily together with machining chip, and moreover, to suppress consumption of the rod electrode 45 by using the electrical discharge machining fluid.

Moreover, in this embodiment, the rod electrode 45 is fitted on the holder member 47 together with the tool bit 9 so as to form a unit. Accordingly, it is easy to carry out a fitting operation of the rod electrode 45 and the tool bit 9 on the boring cutter body 5A.

Third Embodiment

Figure 11:
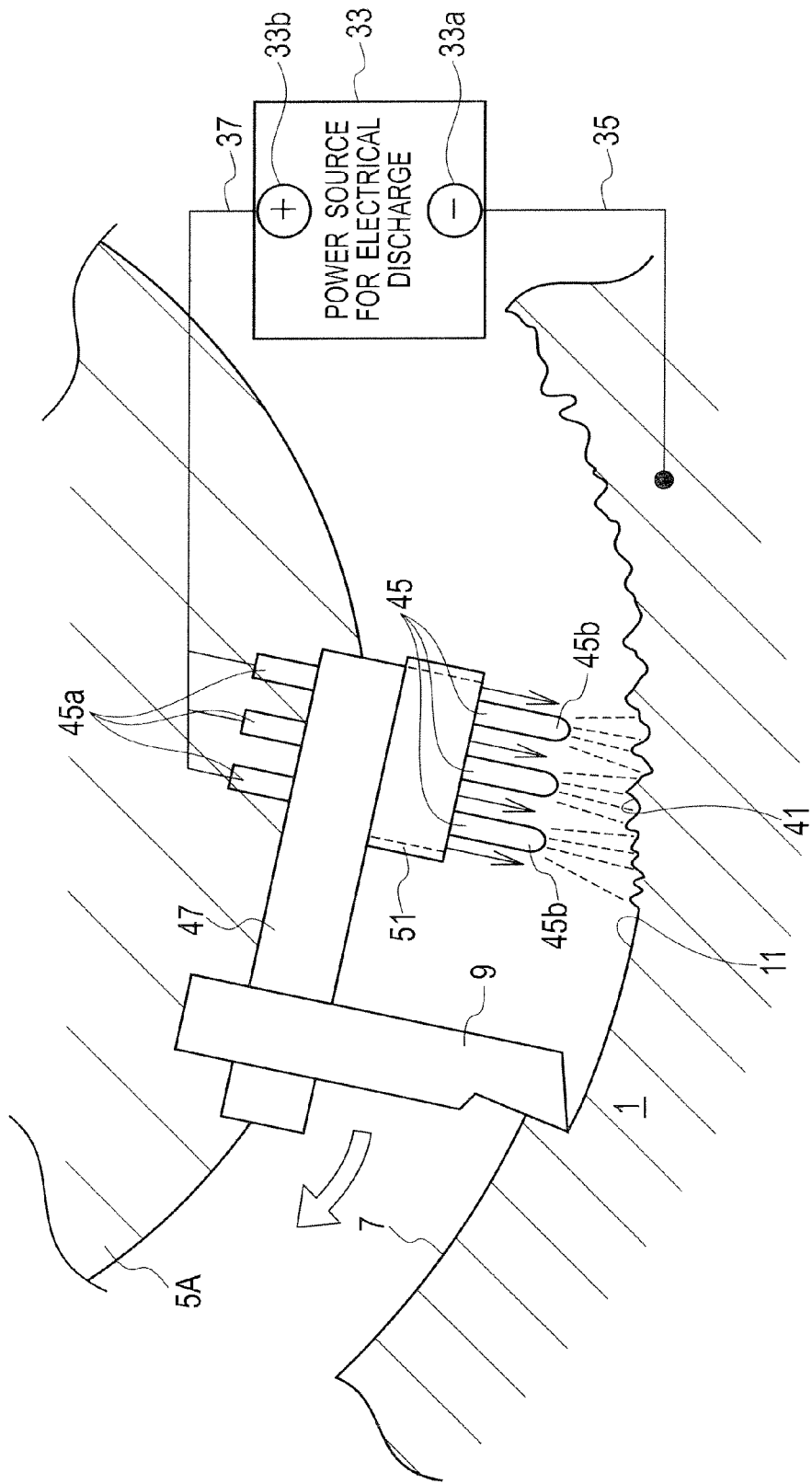
FIG. 11 is a cross-sectional view corresponding to FIG. 2, which shows a third embodiment of the present invention.

As compared to the second embodiment shown in FIG. 9 described above, a third embodiment is configured to provide multiple (three in this case) rod electrodes 45 serially along the groove parts 11 as shown in FIG. 11, and to cover part of these multiple rod electrodes 45 with a hollow machining fluid guide 51.

By providing the multiple rod electrodes 45, it is possible to set a lower voltage to be applied to each of the rod electrodes 45 when forming the finely roughened portions 41 equivalent to those in the second embodiment. Hence it is possible to extend product lives of the rod electrodes 45 in response. Meanwhile, particularly when the boring cutter body 5A is rotated at a high speed, it is possible to process the finely roughened portions 41 being inadequately processed with the rod electrode 45 on the front side in the rotating direction with the rod electrode 45 on the rear side in the rotating direction so as to compensate for such inadequacy. Hence it is possible to more reliably carry out the processing of the finely roughened portions 41.

Although three rod electrodes 45 are provided in FIG. 11, it is also possible to provide two electrodes or four or more electrodes instead.

Fourth Embodiment

In the above-described third embodiment, the multiple rod electrodes 45 are serially arranged along the groove parts 11. Meanwhile, in this fourth embodiment, the rod electrodes 45 are arranged in a zigzag manner along the groove parts 11 as shown in FIG. 12(*a*).

Figure 12:
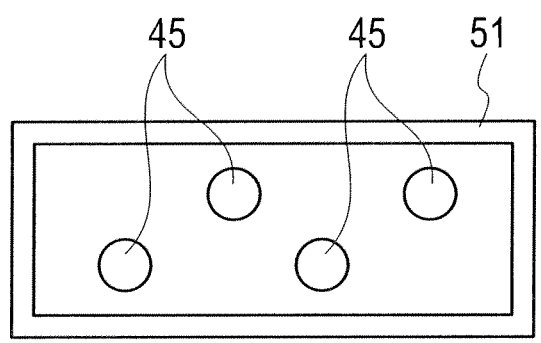
FIG. 12 is a view showing a fourth embodiment of the present invention, in which part (a) is an explanatory view showing an example of arranging rod electrodes according to the fourth embodiment in a zigzag manner and part (b) is an operation explanatory view of the fourth embodiment corresponding to FIG. 5.
Figure 12:
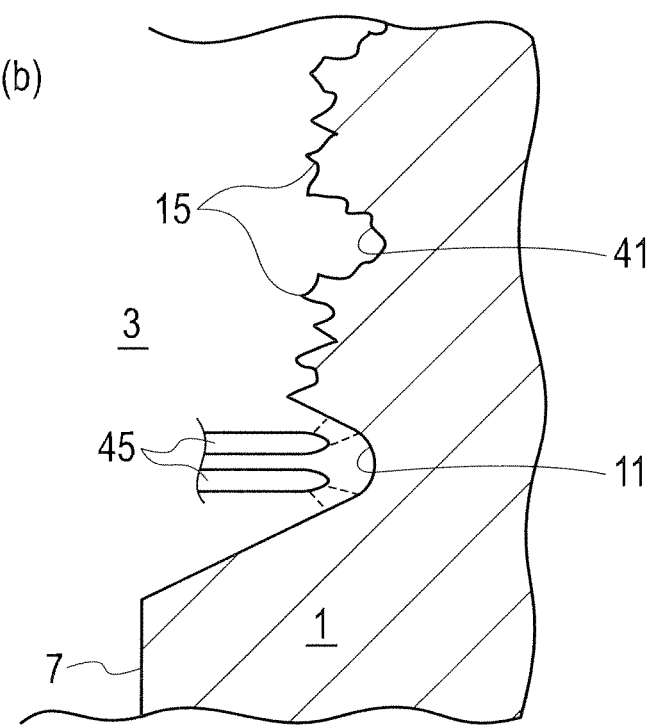

In this way, it is possible to bring the rod electrodes 45 vertically displaced as shown in FIG. 12(*a*) closer to the side surfaces of the groove parts 11 as illustrated in FIG. 12(*b*), and thereby to process the entire groove parts 11 more reliably into the finely roughened portions 41.

Fifth Embodiment

Figure 13:
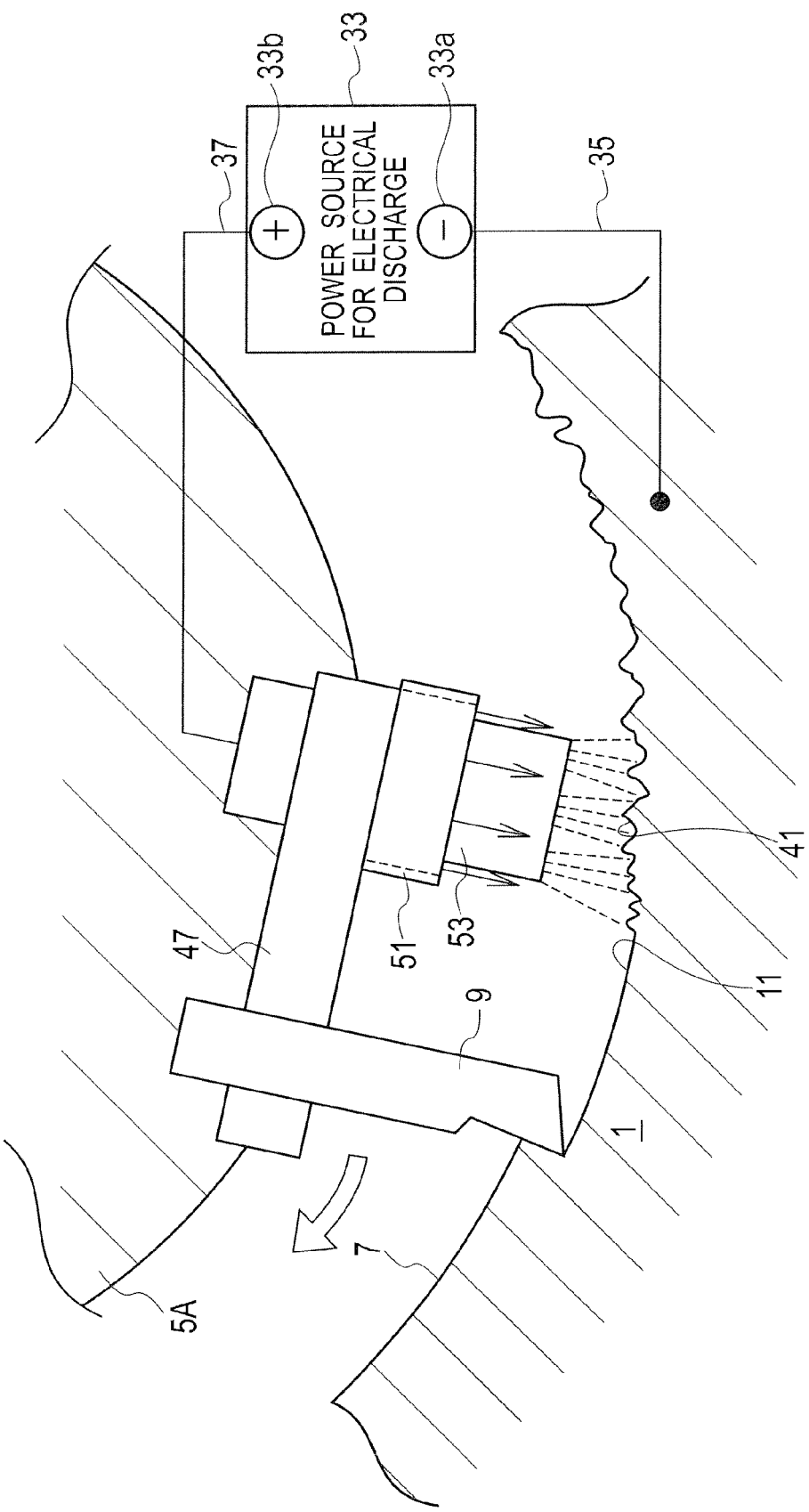
FIG. 13 is a cross-sectional view corresponding to FIG. 2, which shows a fifth embodiment of the present invention.

A fifth embodiment employs a plate electrode 53 as shown in FIG. 13 instead of the multiple rod electrodes 45 in the third embodiment as shown in FIG. 11 described above. This plate electrode 53 is formed into a plate shape elongated along the groove parts 11. By employing the plate electrode 53 as the discharging electrode, it is possible to secure a wider electrode surface to be opposed to the process target surface inside the groove parts 11 as compared to the case of providing the multiple rod electrodes 45 as shown in FIG. 11, and thereby to extend the product lives of the electrodes. Moreover, by forming a wide discharging surface (the electrode surface), it is possible to apply a larger voltage and thereby to form the finely roughened portions 41 having coarser surfaces.

Sixth Embodiment

Figure 14:
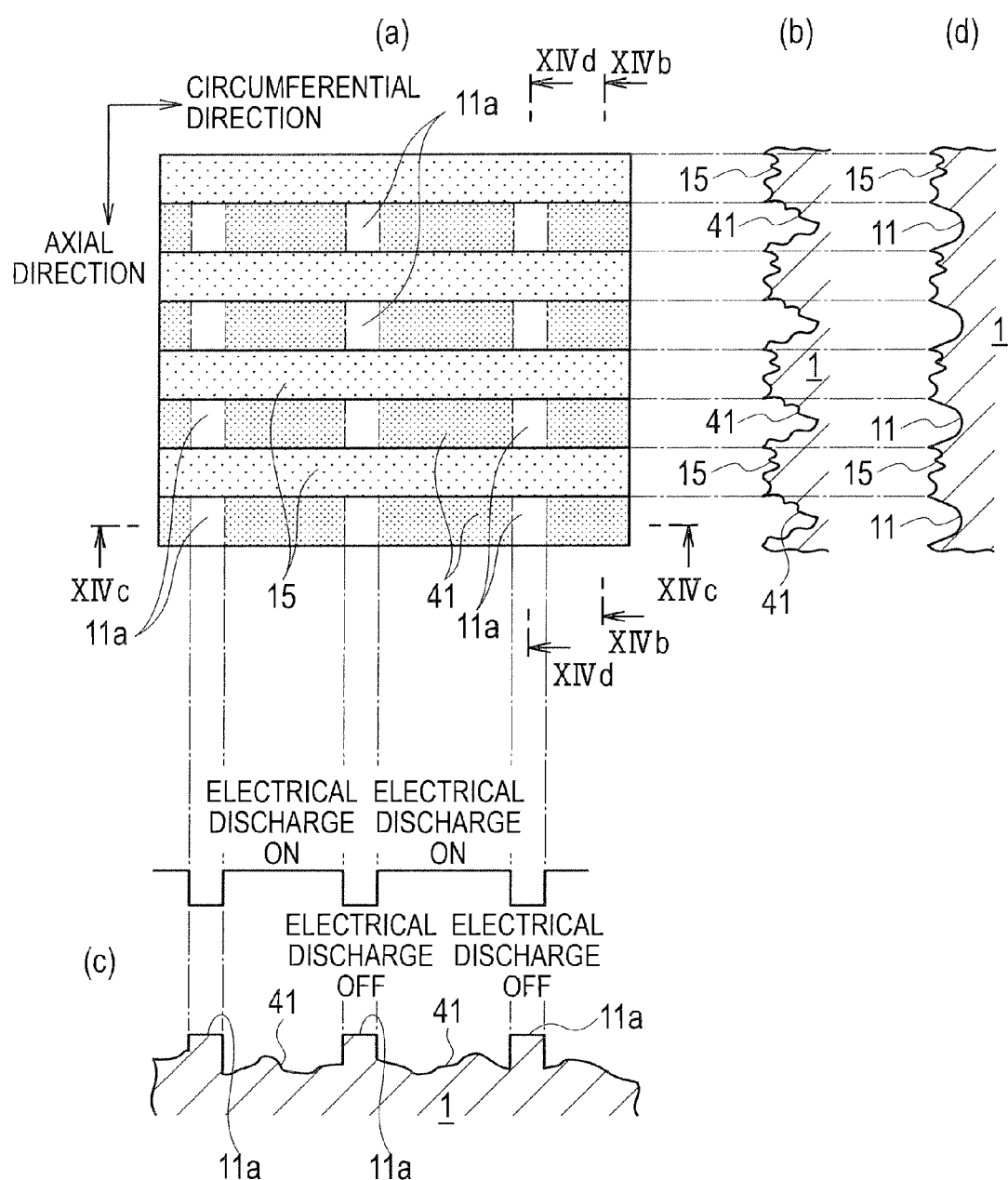
FIG. 14 is a view showing a sixth embodiment of the present invention, in which part (a) is a development view of a process target surface according to the sixth embodiment, part (b) is a cross-sectional view taken along a XIVb-XIVb line in part (a), part (c) is an explanatory view showing a cross-sectional view taken along a XIVc-XIVc line in part (a), with discharge on and off states, and part (d) is a cross-sectional view taken along a XIVd-XIVd line in part (a).

A sixth embodiment is configured to control the voltage application from the power source 33 for the electrical discharge to the discharging electrode in each of the first to fifth embodiments so as to be turned on and off repeatedly as the discharging electrode moves along the groove parts 11 as shown in FIG. 14(*c*). In this way, regions to be provided with the finely roughened portions 41 and regions 11*a* unchanged from the original groove parts 11 not provided with the finely roughened portions 41 are alternately formed at the groove parts 11. Hence it is possible to form a coarser surface geometry along the circumferential direction of the circular hole 3 by a combination of the finely roughened portions 41 and the regions 11*a*, and thereby to further enhance adhesion of the thermal spray coating 43 in the circumferential direction.

Here, although the voltage application of the power source 33 for electrical discharge is turned on and off in the above-described sixth embodiment, it is also possible to apply a lower voltage than the applied voltage when turning the power on, instead of turning the power off. That is, it is only necessary to change the voltage to be applied to the electrode for electrical discharge machining along the circumferential direction of the groove parts 11.

Figure 15:
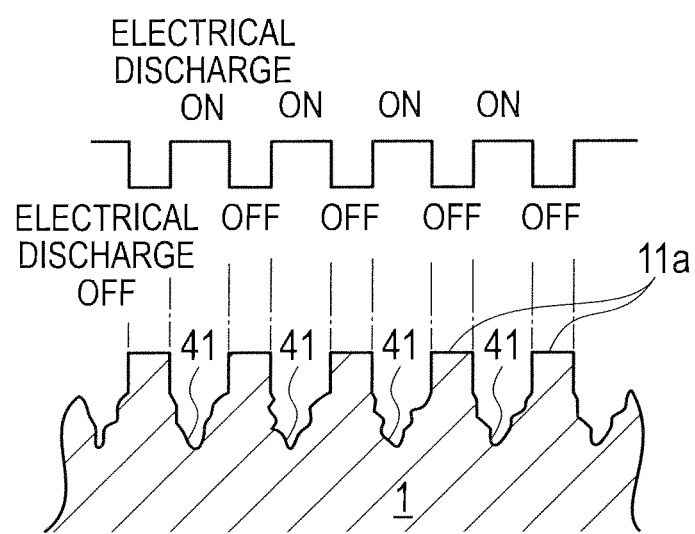
FIG. 15 is an explanatory view corresponding to FIG. 14 part (c), which shows a modified example of the sixth embodiment.

Moreover, although on periods are set longer than off periods in the sixth embodiment shown in FIG. 14 described above, it is also possible to set the on periods equal to the off periods as shown in FIG. 15. Note that the time allocation is not particularly limited.

Seventh Embodiment

Figure 16:
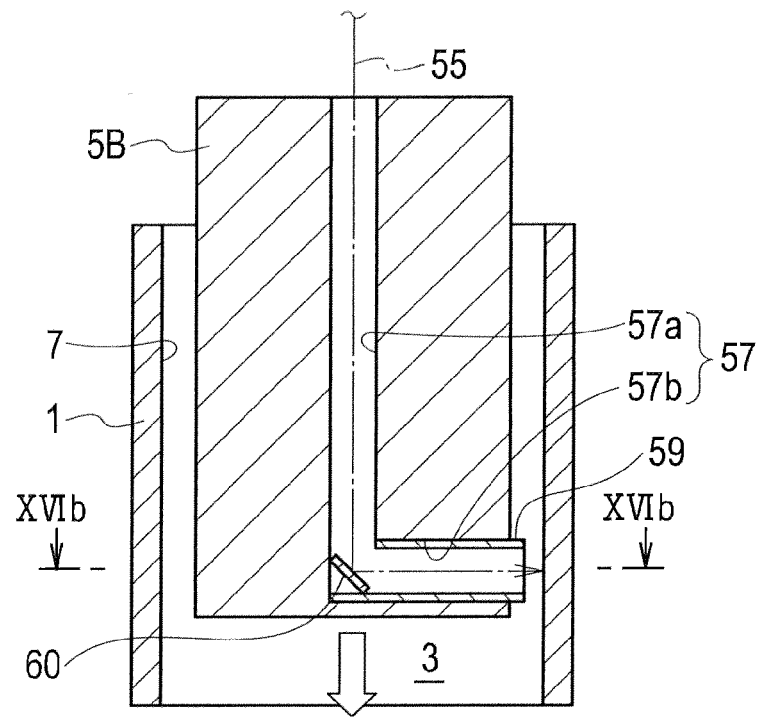
FIG. 16 is a view showing a prespray processing apparatus according to a seventh embodiment of the present invention, in which part (a) is a cross-sectional view of the prespray processing apparatus and part (b) is a cross-sectional view taken along a XVIb-XVIb line in part (a).
Figure 16:
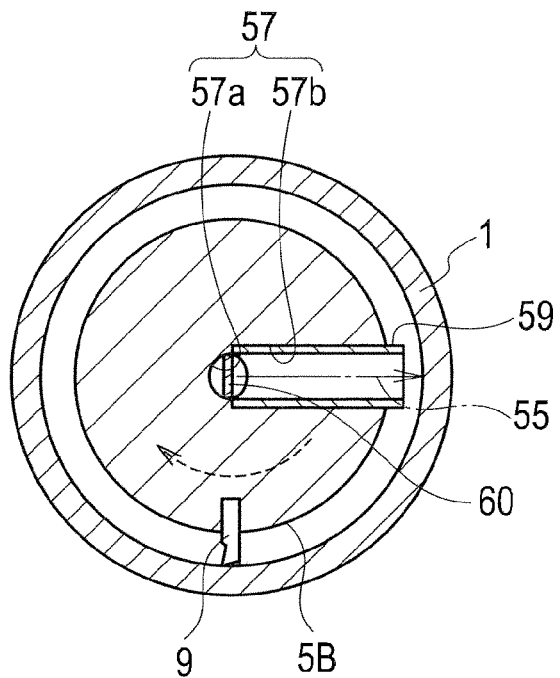
Figure 17:
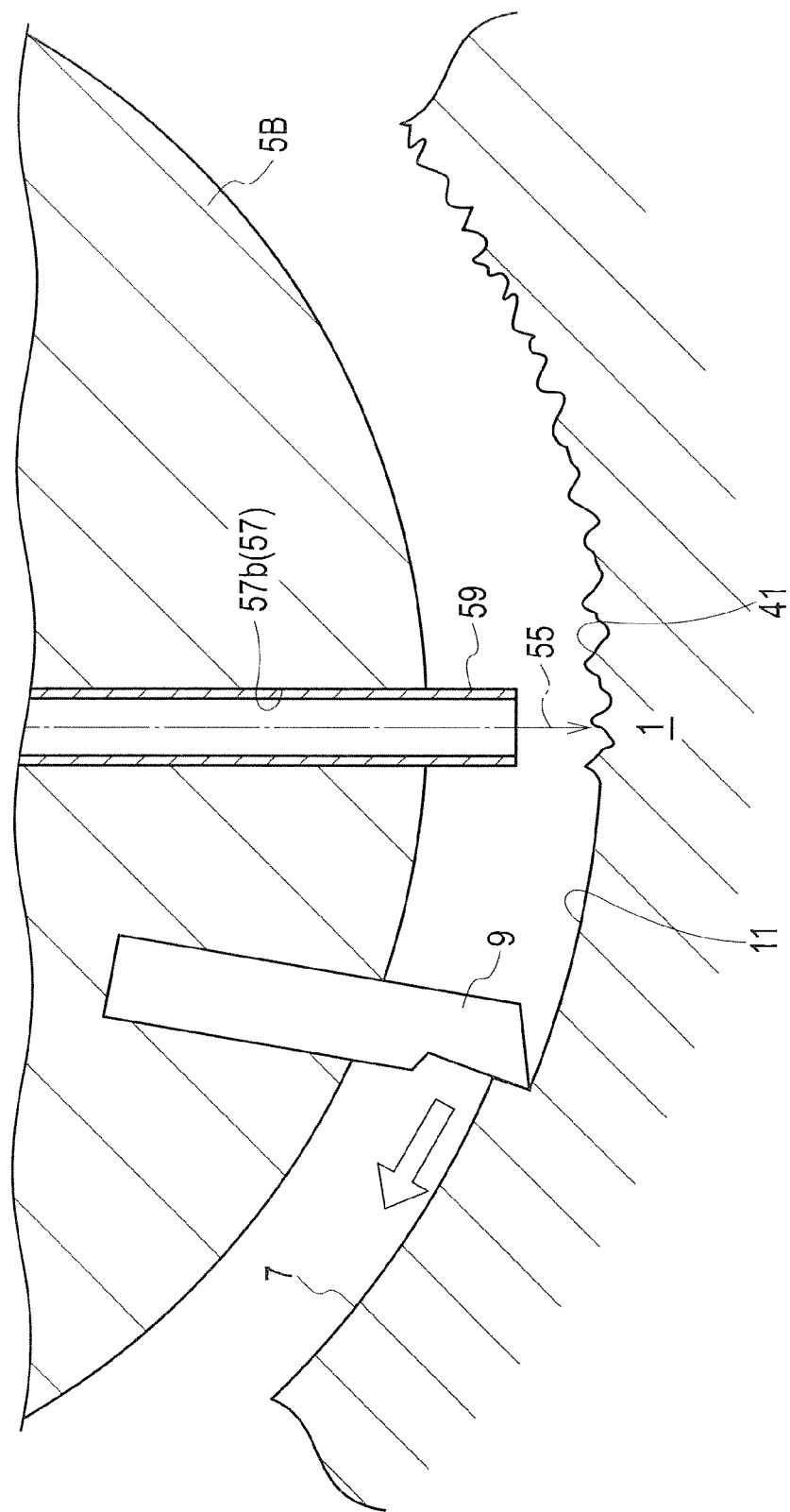
FIG. 17 is a cross-sectional view corresponding to FIG. 2, which shows the seventh embodiment.
Figure 18:
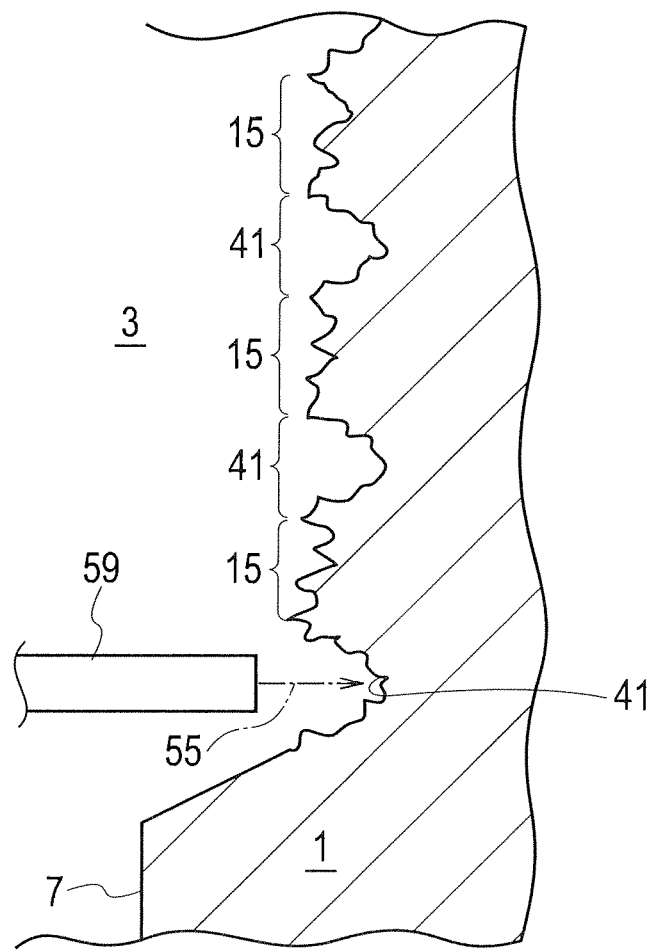
FIG. 18 is an operation explanatory view of the seventh embodiment, which corresponds to FIG. 5.

As shown in FIG. 16 to FIG. 18, a seventh embodiment is configured to form the finely roughened portions 41 by radiating a laser beam 55 onto the groove parts 11 formed on the inner surface 7 of the circular hole 3, instead of electrical discharge machining according to each of the above-described first to sixth embodiments.

In this case, a laser transmission hole 57 serving as a laser beam passage for transmitting the laser beam 55 is formed inside a boring cutter body 5B. The laser transmission hole 57 includes an axial direction hole 57*a* extending from a rear end portion in a central position of the boring cutter body 5B to the vicinity of a position to fit the tool bit 9 on a tip end side thereof, and a radial direction hole 57*b* being communicated with a tip end portion of the axial direction hole 57*a* and extending outward in the radial direction so as to form an opening on an outer peripheral surface.

A cylindrical laser gun 59 constituting a laser processing head that serves as the finely roughened portion forming device is housed in the radial direction hole 57b. The laser gun 59 includes a mirror 60 located in a position corresponding to the axial direction hole 57a at the rear end thereof, which is inclined at an angle of 45 degrees relative to a central axis line of the boring cutter body 5B. The laser beam 55 introduced along the axial direction hole 57 is reflected by this mirror 60 so as to allow the laser beam 55 to advance forward inside the radial direction hole 57b. A tip end portion of the laser gun 59 is allowed to protrude from an outer peripheral surface of the boring cutter body 5B. However, the laser gun 59 does not always have to protrude.

The radial direction hole 57b for housing the above-described laser gun 59 and the tool bit 9 are set to positions which are substantially the same position in the direction of the central axis line of the boring cutter body 5B and away from each other with provision of an angle of 90 degrees along the circumferential direction. Note that the positional relationship between the tool bit 9 and the laser gun 59 in the axis line direction and the circumferential direction may be set arbitrarily as long as it is possible to radiate the laser beam 55 from the laser gun 59 onto the groove parts 11 processed by the tool bit 9.

Meanwhile, the laser beam 55 inside the boring cutter body 5B may be oscillated by an unillustrated laser oscillator provided outside and then may be introduced from a center at a rear end of an unillustrated machining center for holding and rotating the boring cutter body 5B into the boring cutter body 5B.

Next, operations of the seventh embodiment will be described. The boring cutter body 5B is inserted into the circular hole 3 and is moved in the axial direction while being rotated as similar to the first embodiment, thereby forming the groove parts 11 made of the screw-shaped spiral groove. As shown in FIG. 4 described above, the ridge parts 13 formed at this time include the broken surfaces 15 which are finer than the concavo-convex shaped portions comprised of the groove parts 11 and the ridge parts 13.

At the time of the cutting process with the above-described tool bit 9, the finely roughened portions 41 are formed substantially across the entire groove parts 11 by radiating the laser beam 55 from the laser gun 59 located in the vicinity of the rear part in the rotating direction of the boring cuter body 5B onto the inside of the groove parts 11. In this way, the finely roughened portions 41 are formed by subjecting the surface of the member to the cutting process (a first machining process) with the cutting edge of the tool bit 9 and to the laser process (a second machining process) with the laser beam 55 at the same time. As similar to the first embodiment, the above-described finely roughened portions 41 become finer than the broken surfaces 15 formed by ripping some tip ends of the ridge parts 13 at the time of the cutting process with the tool bit 9.

As described above, in this embodiment, it is possible to form the finely roughened portions 41 by means of the laser process configured to radiate the laser beam 55 onto the groove parts 11. In this way, the ridge parts 13 are subjected to surface roughening by forming the broken surfaces 15 on the tip ends thereof by means of the cutting process with the tool bit 9 and the groove parts 11 are also subjected to surface roughening by forming the finely roughened portions 41. Hence is it possible to obtain similar effects to those of the first embodiment including the capability of enhancing adhesion of the thermal spray coating 43 (FIG. 7) later as compared to the case of not subjecting the groove parts 11 to surface roughening, and so forth.

Concerning the radiation of the above-described laser beam 55 as well, the regions to be provided with the finely roughened portions 41 and the regions 11a unchanged from the original groove parts 11 not provided with the finely roughened portions 41 are alternately formed at the groove parts 11 by repeating on and off as similar to electrical discharge machining as shown in FIG. 14 and FIG. 15. Hence it is possible to form the coarser surface geometry along the circumferential direction of the circular hole 3 by the combination of the finely roughened portions 41 and the regions 11a, and thereby to further enhance adhesion of the thermal spray coating 43 in the circumferential direction.

Here, although the cylindrical laser gun 59 serving as the laser processing head is provided inside the radial direction hole 57b in the above-described seventh embodiment, it is also possible to cause the laser beam 55 to advance simply inside the radial direction hole 57b by employing a similar arrangement to that of the axial direction hole 57a. Specifically, in this case, the radial direction hole 57b constitutes the laser processing head per se. Moreover, in this case, the mirror 60 is installed at a bottom portion of the axial direction hole 57a. Concerning this mirror 60, it is possible to cause the axial direction hole 57a to penetrate to the tip end side and then to integrate the mirror 60 with a lid member to be attached so as to occlude an opening at a tip end of the penetrated hole 57a.

The respective embodiments described above are merely examples disclosed in order to facilitate understanding of the present invention. The present invention is not limited only to these embodiments and various modifications are possible within the technical scope of the invention. For example, the process target surface has been described as the inner surface 7 of the circular hole 3 in each of the embodiments. However, the process target surface may also be of a flat shape.

This application is based upon and claims the benefit of priority from the prior Japanese Patent Application No. 2009-146877 filed on Jun. 19, 2009; the entire contents of which are incorporated herein by reference.

INDUSTRIAL APPLICABILITY

According to the present invention, it is possible to enhance adhesion of a thermal spray coating by using broken surfaces formed on tips of ridge parts and to further enhance adhesion of the thermal spray coating by using finely roughened portions formed on groove parts. Moreover, it is possible to provide a prespray processed form, a prespray processing method, and a prespray processing apparatus capable of ensuring strength at base ends of the ridge parts by forming the finely roughened portions at the groove parts finer than the broken surfaces at the ridge parts.

REFERENCE SIGNS LIST

3 CIRCULAR HOLE
5, 5A, 5B BORING CUTTER BODY (MAIN BODY OF PROCESSING TOOL)
7 INNER SURFACE OF CIRCULAR HOLE (SURFACE OF MEMBER ON WHICH THERMAL SPRAY COATING IS FORMED)
9 TOOL BIT (CUTTING TOOL)
11 GROOVE PART
13 RIDGE PART
15 BROKEN SURFACE FORMED ON TIP OF RIDGE PART

17 WIRE ELECTRODE (ELECTRODE FOR ELECTRICAL DISCHARGE MACHINING, FINELY ROUGHENED PORTION FORMING DEVICE)
19 FEED ROTATING REEL (WIRE FEEDING UNIT)
21 COLLECTION ROTATING REEL (WIRE COLLECTING UNIT)
23 MOTOR FOR ROTATING AND DRIVING COLLECTION ROTATING REEL (DRIVER)
25 WIRE ELECTRODE GUIDE (GUIDE MEMBER)
39 TENSION PROVIDING MECHANISM (TENSION PROVIDER)
41 FINELY ROUGHENED PORTION FORMED AT GROOVE PART
45 ROD ELECTRODE (ELECTRODE FOR ELECTRICAL DISCHARGE MACHINING, FINELY ROUGHENED PORTION FORMING DEVICE)
47 HOLDER MEMBER (FITTING)
53 PLATE ELECTRODE (ELECTRODE FOR ELECTRICAL DISCHARGE MACHINING, FINELY ROUGHENED PORTION FORMING DEVICE)
55 LASER BEAM
59 LASER GUN (LASER PROCESSING HEAD, FINELY ROUGHENED PORTION FORMING DEVICE)

The invention claimed is:

1. A prespray processing method comprising:
a broken surface forming step of using a cutting tool to form groove parts on a surface of a member where a thermal spray coating is to be formed while forming broken surfaces on tips of ridge parts generated by formation of the groove parts, each broken surface being formed by ripping a part of the ridge part by a chip, which is originally part of the member, generated from the member at the time of cutting; and
a finely roughened portion forming step, performed after the broken surface forming step, of forming finely roughened portions, finer than the broken surfaces, on the groove parts by performing a process on the groove parts among the ridge parts and the groove parts by use of a finely roughened portion forming device different from the cutting tool,
wherein each of the ridge parts is defined by two sloping surfaces extending along directions which meet to form an acute angle pointing perpendicular to the surface of the member, and each of the two sloping surfaces is smoothly connected to an inner surface of the groove part arranged next to the each of the ridge parts.

2. The prespray processing method according to claim 1, wherein the surface of the member is an inner surface of a circular hole,
the cutting tool is used to form the groove parts extending in a circumferential direction of the inner surface of the circular hole while forming the broken surfaces on the tips of the ridge parts, and
the finely roughened portions are formed by moving the finely roughened portion forming device in a circumferential direction of the groove parts.

3. The prespray processing method according to claim 2, wherein the finely roughened portion forming device comprises an electrode for electrical discharge machining, and
wherein the finely roughened portions are formed by performing, as the process, electrical discharge machining using the electrode for electrical discharge machining.

4. The prespray processing method according to claim 3, wherein a voltage applied to the electrode for electrical discharge machining is changed in the circumferential direction of the groove parts.

5. The prespray processing method according to claim 3, wherein a wire electrode is used as the electrode for electrical discharge machining.

6. The prespray processing method according to claim 5, wherein the wire electrode is sequentially fed out from a wire feeding unit provided inside a main body of a processing tool while the wire electrode is being moved inside the groove parts in the circumferential direction of the groove parts, and
the wire electrode after use for the electrical discharge machining is collected by a wire collecting unit provided inside the main body.

7. The prespray processing method according to claim 2, wherein the finely roughened portion forming device comprises a head for laser processing, and
wherein the finely roughened portions are formed by performing, as the process, laser processing using the head for laser processing.

8. The prespray processing method according to claim 7, wherein an output of a laser beam radiated from the head for laser processing is changed in the circumferential direction of the groove parts.

9. The prespray processing method according to claim 2, wherein the cutting tool and the finely roughened portion forming device are attached to a main body of a processing tool,
the groove parts are formed by the cutting tool by inserting the main body into the circular hole and rotating the main body relative to the circular hole, and
thereafter, the finely roughened portions are formed at the groove parts by using the finely roughened portion forming device.

* * * * *